United States Patent
Chiang et al.

(10) Patent No.: US 7,273,174 B2
(45) Date of Patent: Sep. 25, 2007

(54) OPTICAL PEN HAVING A LIGHT PATH COAXIAL WITH ITS PEN TIP

(75) Inventors: Shui Chuan Chiang, Hsinchu (TW); Shih Yuan Chang, Taipei (TW)

(73) Assignee: Aiptek International Inc., Hsin-Chu (TW)

( * ) Notice: Subject to any disclaimer, the term of this patent is extended or adjusted under 35 U.S.C. 154(b) by 181 days.

(21) Appl. No.: 11/088,717

(22) Filed: Mar. 25, 2005

(65) Prior Publication Data
US 2006/0151610 A1    Jul. 13, 2006

(30) Foreign Application Priority Data
Jan. 10, 2005   (TW) ............................. 94100666 A (51) Int. Cl.
*G06K 7/10* (2006.01)
(52) U.S. Cl. ............. 235/454; 235/472.01; 235/472.03
(58) Field of Classification Search ................ 235/454, 235/462.01, 462.45, 462.49, 472.03
See application file for complete search history.

(56) References Cited
U.S. PATENT DOCUMENTS
6,729,547 B1 * 5/2004 Charlier et al. ........ 235/462.45
2002/0074403 A1 * 6/2002 Krichever et al. .......... 235/454
2005/0156915 A1 * 7/2005 Fisher ......................... 345/179
2005/0167507 A1 * 8/2005 Swartz et al. .......... 235/472.01
2006/0028456 A1 * 2/2006 Kang .......................... 345/179

FOREIGN PATENT DOCUMENTS
JP    2004164142 A *  6/2004

* cited by examiner

*Primary Examiner*—Steven S. Paik
(74) *Attorney, Agent, or Firm*—Troxell Law Office, PLLC (57) ABSTRACT

An optical pen comprising a shaft, a pen tip, a light source and an optical sensor. The shaft extends a predetermined length along an axial direction. The pen tip is arranged at one end of the shaft and situated in the same axial direction. The light source produces light that illuminates an outlying surface near the pen tip to generate a reflected imaging light traveling along a light path. The light path has at least a portion near the pen tip overlapping with said axial direction. The optical sensor is disposed in the light path to receive the imaging light and convert it into electrical signals. In light that the light path that captures imaging light from the optical pen is coaxial with the pen tip, when the optical pen is used for writing, the traveling speed, direction, and distance of images captured by the optical sensor are identical to those of the pen tip.

9 Claims, 9 Drawing Sheets

OPTICAL PEN HAVING A LIGHT PATH COAXIAL WITH ITS PEN TIP

BACKGROUND OF INVENTION

1. Field of the Invention

The present invention relates to an optical pen having a light path coaxial with its pen tip, in particular a kind of optical pen that integrates the functions of optical mouse and handwriting recognition where the path of captured imaging light is coaxial with the pen tip.

2. Description of the Prior Art

For electronic information devices such as desktop or notebook computers, personal digital assistants (PDA), and smart phones that require massive data input, handwriting input device is undoubtedly a convenient alternative to mouse and keyboard.

Currently known handwriting input devices may be classified into three types; one needs to be used with pressure-sensing touch screen, one uses electromagnetic-sensing digital panel, and one uses optical pen. Optical pen is the more popular handwriting input device at the present time due to its relatively low cost and the ability to write on any surface.

Figure 1:
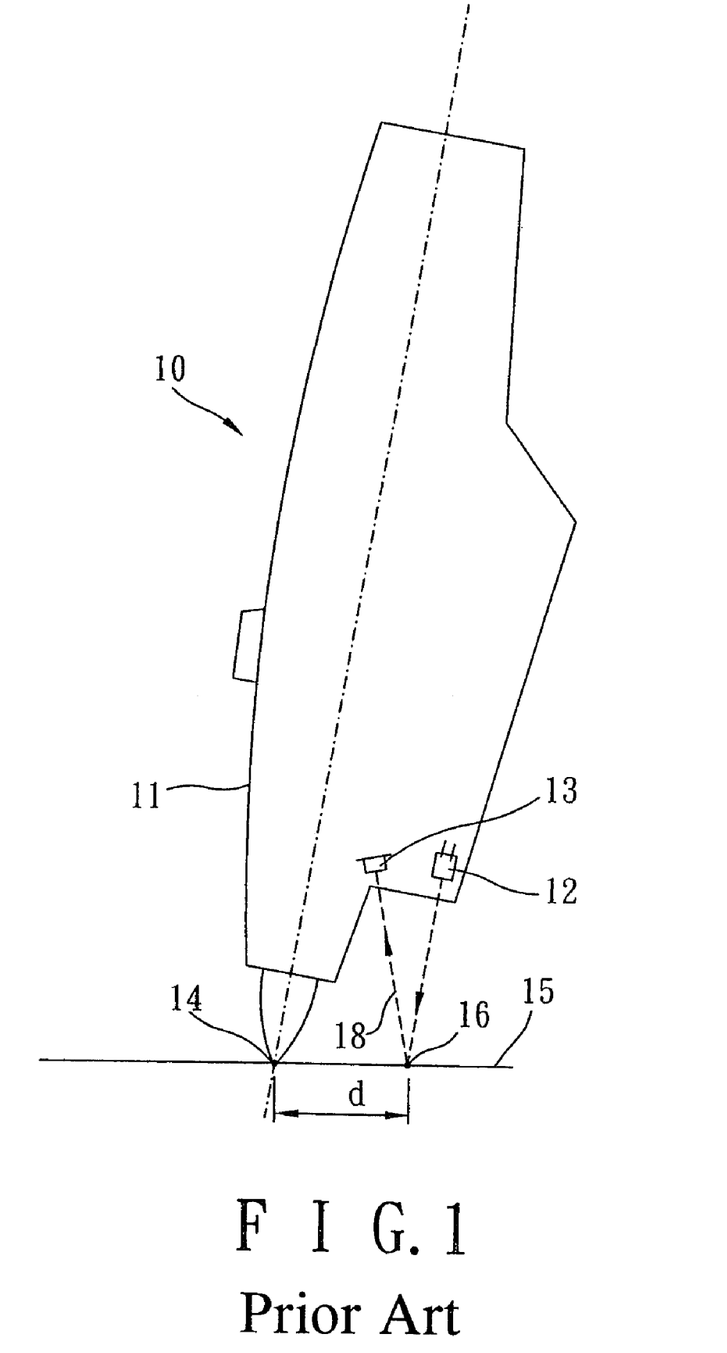
FIG. 1 is a schematic view of a conventional optical pen.

FIG. 1 is a schematic view of conventional optical pen 10, which is essentially an optical mouse in the shape of a pen. The shaft of the pen 11 makes it easy for the users to hold the pen when writing, while light source 12 and optical sensor 13 arranged at the bottom of the body 11 can capture the reflected image in a small area 16 on an outlying surface 15 near the tip of the pen 14. When the optical pen 10 moves, the captured images will undergo continuous and directional changes, from which the moving directions and speed of optical pen 10 are detected. By transmitting such information to an electronic information device connected to the optical pen 10 for processing, handwriting input is achieved.

Figure 2A:
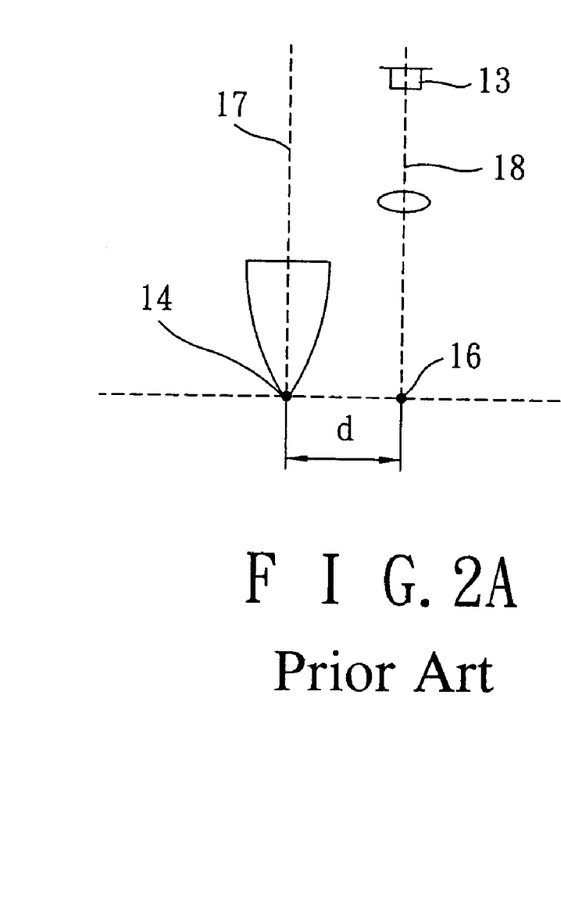
FIG. 2A is a schematic view of the position of light path of conventional optical pen as shown in FIG. 1 relative to the pen tip.
Figure 2B:
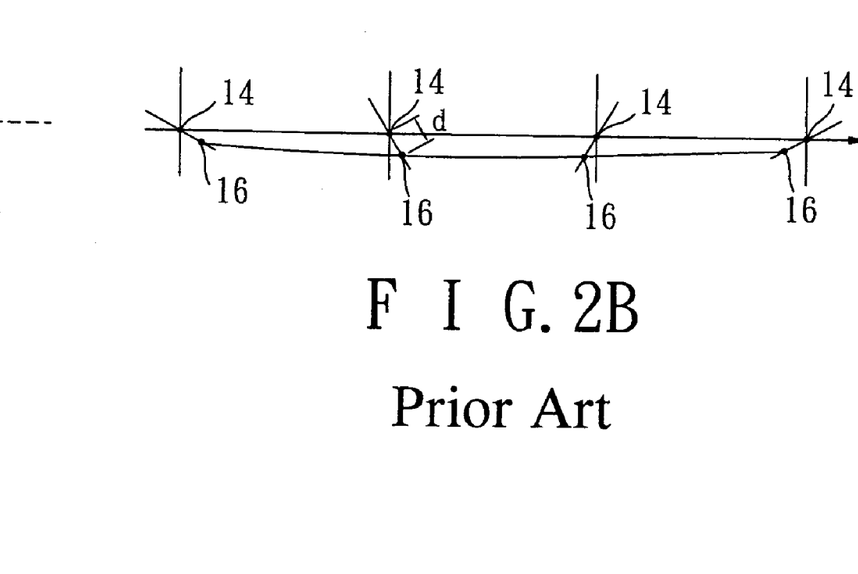
FIG. 2B is a schematic view of the position of pen tip of conventional optical pen as shown in FIG. 1 relative to images captured by optical sensor when the optical pen turns and moves.

However conventional optical pen 10 as shown in FIG. 1 has an apparent drawback. FIG. 2A and FIG. 2B depict respectively the position of light path of optical pen 10 (FIG. 1) relative to pen tip 14 and the position of pen tip 14 relative to images of the small area 16 captured by optical sensor 13 when optical pen 10 moves. In light that the axial direction 17 of pen tip 14 of conventional optical pen 10 is not the same as (not overlapping with) that of the light path 18 of images captured by optical sensor 13 (i.e. light traveling path), there is a spacing d between the pen tip 14 and the images of the small area 16 captured by optical sensor 13. When the user of optical pen 10 writes, the optical pen 10 generates rotational movement (as shown in FIG. 2B), during which the traveling speed, direction and distance of images captured by optical sensor 13 are different from those of pen tip 14. Consequently, the pen tip 14 travels in straight line, while the images of the small area 16 captured by optical sensor 13 move along a curved arc. When the pen makes turns (i.e. not writing in straight line), the images of text or graph captured by optical sensor 13 are prone to distortion or result in discontinuous lines. Such drawback needs improvement.

SUMMARY OF INVENTION

The primary object of the present invention is to provide an optical pen having a light path coaxial with its tip, such that the traveling speed, direction and distance of images captured by an optical sensor when the pen writes are identical to those of the pen tip.

Another object of the present invention is to provide an optical pen having a light path coaxial with its tip, which integrates the functions of optical mouse and handwriting recognition where the path of imaging light captured by the optical pen is coaxial with the pen tip.

Yet another object of the present invention is to provide an optical pen having a light path coaxial with its tip where the light from the light source is guided towards the vicinity of pen tip through the arrangement of a light guide, and by hollowing out the pen tip, the reflected imaging light near the pen tip enters the tip through the hollowed out space so the path of imaging light captured by the optical pen becomes coaxial with the pen tip.

To achieve the aforesaid objects, the optical pen having a light path coaxial with the pen tip according to the present invention comprises a shaft, a pen tip, a light source, and an optical sensor. The shaft extends a predetermined length along an axial direction. The tip is arranged at one end of the shaft and situated in the same axial direction. The light source produces beam that shines on an outlying surface near the pen tip to generate a reflected imaging light. Said imaging light travels along a light path inside the pen tip and said light path has at least a portion overlapping with said axial direction. The optical sensor is disposed in the light path to receive the imaging light and convert it into electrical signals.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

The details of the present invention will be more readily understood from a detailed description of the preferred embodiments taken in conjunction with the following figures.

DETAILED DESCRIPTION

Figure 3:
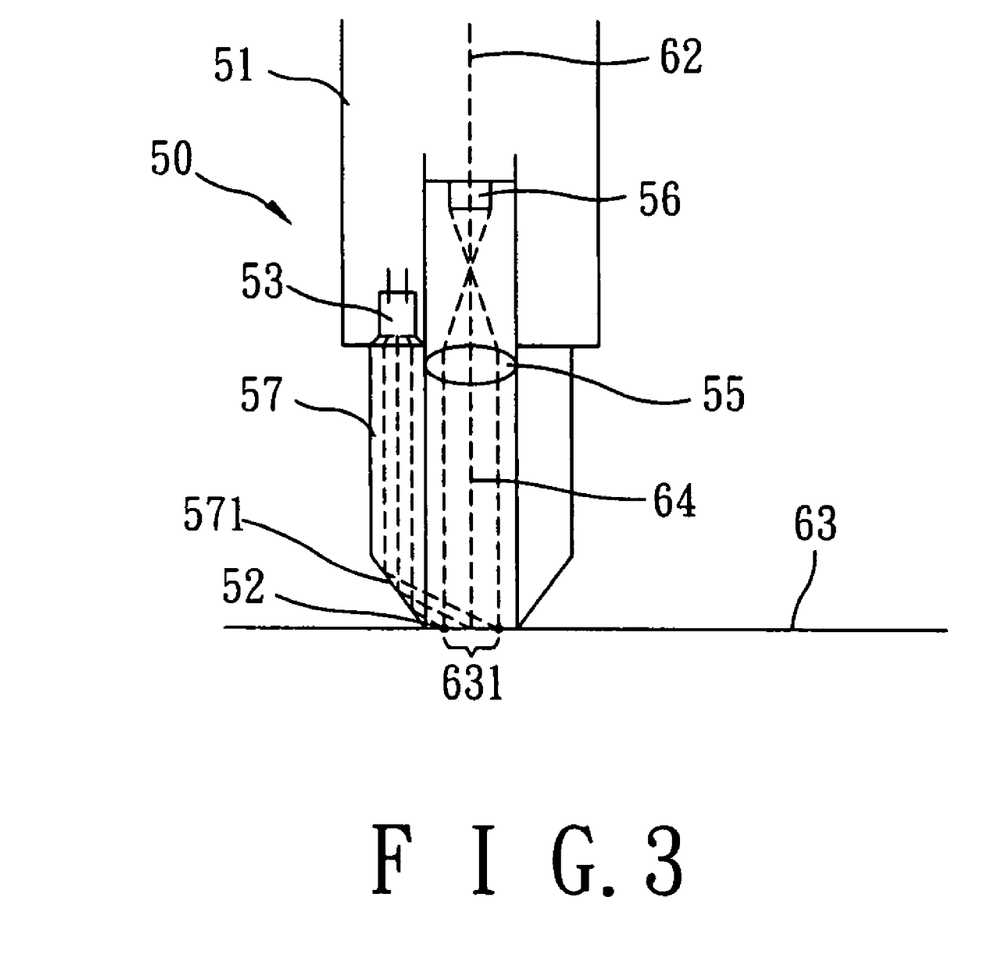
FIG. 3 is a schematic view of the first preferred embodiment of an optical pen having a light path coaxial with the pen tip according to the invention.
Figure 4A:
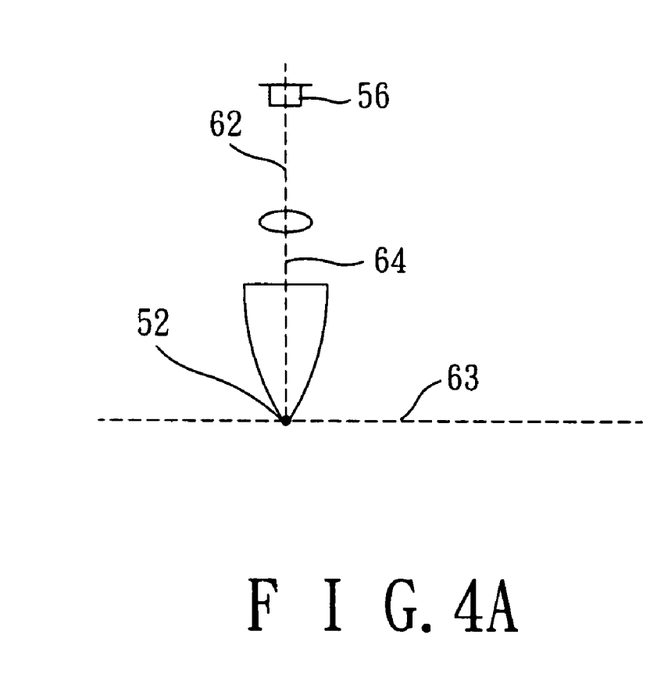
FIG. 4A is a schematic view of the position of light path of optical pen according to the invention relative to the pen tip.
Figure 4B:
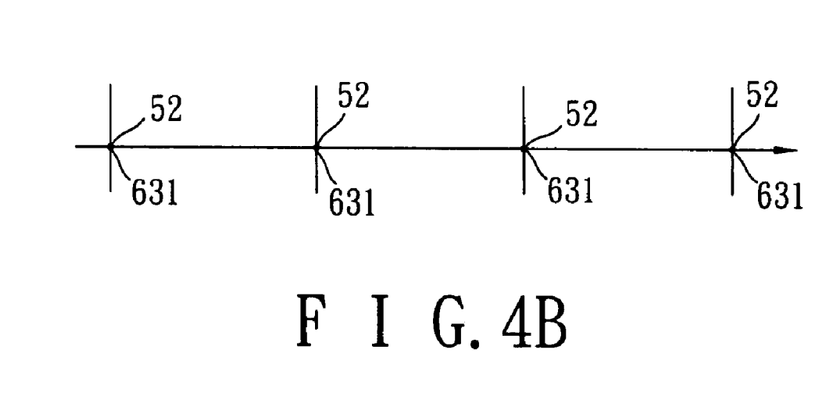
FIG. 4B is a schematic view of the position of pen tip of optical pen according to the invention relative to images captured by optical sensor when the optical pen turns and moves.

Referring to FIG. 3, FIG. 4A and FIG. 4B which show respectively a schematic view of the first preferred embodiment of an optical pen 50 having a light path coaxial with the pen tip according to the invention, the schematic view of position of the light path of the optical pen relative to its tip, and the position of pen tip relative to images captured by optical sensor when the optical pen moves.

The first preferred embodiment of an optical pen 50 as shown in FIG. 3 comprises a shaft 51, a pen tip 52, a light source 53, a lens 55, an optical sensor 56, and a light guide 57.

The shaft 51 constitutes the body of optical pen 50 to accommodate its parts. In this embodiment, shaft 51 is in long and narrow rod shape, which generally extends a predetermined length along an axial direction 62.

Pen tip 52 is arranged at one end (bottom) of shaft 51 and situated in the same axial direction 62. Thus in this embodiment, the shaft 51 and the tip 52 have the same axial direction 62. The very end of light guide 57 (the bottom) constitutes pen tip 52. The light guide 57 is made of light guiding material with top end near the light source 53 and the other end near the pen tip 52 and disposed with an inclined conical plane 571. The inclined conical plane 571 can form a reflective plane by, for example, coating a layer of optical reflection material on the external surface or by simply arranging the light guide 57 at a proper angle so that its interior light source is deflected by the inclined conical plane 571. Thus light produced by light source 53 enters light guide 57 and is guided by it. That is, the light undergoes multiple reflections inside light guide 57 and travels forward along the extension of light guide 57, and finally, is reflected by the inclined conical plane 571 before exiting from the end of pen tip 52. With the arrangement of a light guide 57, light produced by light source 53 can be guided to and converge on an area 631 on an outlying surface 63 near pen tip 52 to achieve the convergence of rays.

The light source 53 produces light to shine on an outlying surface near pen tip 52 to obtain reflected imaging light in a small area 631 on the outlying surface 63. The route traveled by the reflected image light may be defined as a light path 64. In this embodiment, the light source 53 may be a light-emitting diode (LED) or a micro-sized conventional tungsten light bulb. The path of the reflected imaging light 64 is coaxial with the axial direction 62 of pen tip 52 (i.e. overlapping).

The lens 55 is disposed anterior to optical sensor 56, which may be a single lens or a lens set to converge imaging light and form images on optical sensor 56. Optical sensor 56 is for receiving imaging light in the vicinity of pen tip 52 and converting it into an electric signal. In this embodiment, the optical sensor 56 is a CMOS sensor or a coupled charged device (CCD) sensor.

Through the design described above, the path traveled by the reflected imaging light from optical pen 50 (i.e. light path 64) will overlap with axial direction 62 as shown in FIG. 4A (that is, light path of imaging light 64 is coaxial with pen tip 52). Therefore as shown in FIG. 4B, the traveling speed, direction and distance of images in a small area 631 captured by the optical sensor 56 of optical pen 50 will be identical to those of pen tip 52 when the user performs handwriting input. Regardless whether the optical pen 50 writes in straight line or makes turns (i.e. not writing in straight line), the images of text or graph captured by optical sensor 13 will not become distorted or discontinuous lines, an improvement over the prior art.

Figure 5:
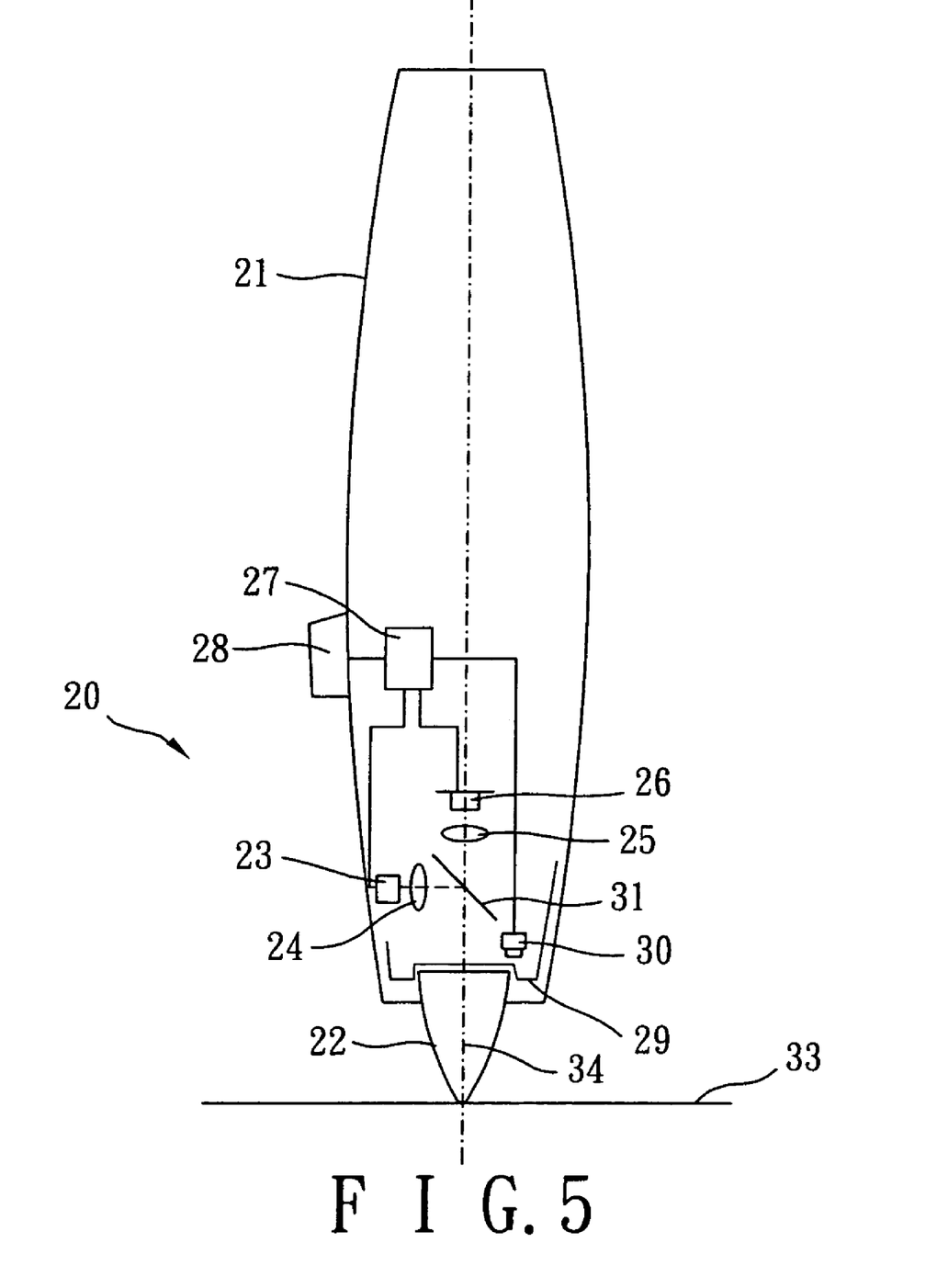
FIG. 5 is a schematic view of the second preferred embodiment of an optical pen having a light path coaxial with the pen tip according to the invention.

As shown in FIG. 5, the second preferred embodiment of an optical pen 20 having a light path coaxial with pen tip according to the present invention comprises: a shaft 21, a pen tip 22, a light source 23, a first lens 24, a second lens 25, an optical sensor 26, a control unit 27, a button 28, an elastic member 29, a pressure sensor 30 and a half-reflective-half-transparent mirror 31.

The shaft 21 extends a predetermined length along an axial direction 32 and constitutes the body of optical pen 20 to accommodate its parts. The tip 22 is arranged at one end (bottom) of shaft 21 and situated in the same axial direction 32. In this embodiment, the tip 22 is a solid, transparent element made of transparent plastic, acrylic, glass or quartz.

The light source 23 produces light to illuminate an outlying surface 33 near pen tip 22 to obtain reflected imaging light in a small area on the outlying surface 33.

The first lens 24 is disposed in the vicinity of light source 23, which may be a single lens or a lens set. The first lens 24 converges light produced by light source 23 by and large on a small area of predetermined size on outlying surface 33 near pen tip 22. The size of said small area preferably ranges between 3 mm*3 mm and 8 mm*8 mm.

The second lens 25 is disposed anterior to optical sensor 26, which may be a single lens or a lens set to converge imaging light and form images on optical sensor 26.

Optical sensor 26 is for receiving imaging light in the vicinity of pen tip 22 and converting it into an electric signal.

The control unit 27 connects to light source 23 and optical sensor 26 to receive electrical signal from optical sensor 26 and process the signal to generate a corresponding first control signal, which is then transmitted in a wired or wireless fashion to a connecting external electronic information device (not shown in the figure) for further processing to execute a first predetermined function, such as controlling the movement and positioning of cursor or handwriting input.

The button 28 is connected to the control unit 27. By pressing the button 28, the control unit 27 can produce a corresponding second control signal, which is transmitted to a connecting external electronic information device for further processing to execute a second predetermined function, such as executing the function corresponding to the position of cursor (similar to the function performed by the button of conventional mouse).

The elastic member 29 is linked to pen tip 22 that allows pen tip 22 to carry out extension-retraction displacement of predetermined distance upon external pressure. At the same time, pressure sensor 30 is disposed inside the shaft 21 at a position near pen tip 22 to detect the displacement motion of pen tip 22 and generate a corresponding third control signal. When user of optical pen 20 presses down pen tip 22 against the outlying surface 33, pressure sensor 30 can generate a third control signal, which is transmitted to a connecting external electronic information device through control unit 27 to execute a third predetermined function, such as changing the thickness of graphical or textual lines inputted according to the level of pressure (i.e. brush strokes can be written) or actuating image scan, or using the retractable pen tip 22 as another button. In this embodiment, light source 23 and optical sensor 26 are not linked to pen tip 22 so that when the pen tip 22 carries out extension-retraction displacement, light source 23 and optical sensor 26 would not move along with the pen tip 22.

The half-reflective-half-transparent mirror 31 is situated in axial direction 32 at a roughly 45 degree angle intersecting axial direction 32 with light source 23 and optical sensor 26 disposed at two opposing sides. Light produced by light source 23 shines on the half-reflective-half-transparent mirror 31 by and large at a 90 degree angle intersecting axial direction 32 so that part of the light is reflected by half-reflective-half-transparent mirror 31 and shoots at an area near pen tip 22. The optical sensor 26 is also situated in axial direction 32 where part of imaging light shot back from an area near pen tip 22 would penetrate half-reflective-half-transparent mirror 31 and reach optical sensor 26. Thus in this embodiment, the traveling path of reflected imaging light (i.e. light path 34) from optical pen 20 would also overlap axial direction 32 (that is, the path of imaging light 34 is coaxial with pen tip 22).

The other preferred embodiments described below have identical or similar elements to those described earlier. Those elements are assigned the same numerals (with only a English letter suffix for distinction purpose) and names and their detailed constitutions are not elaborated.

Figure 6:
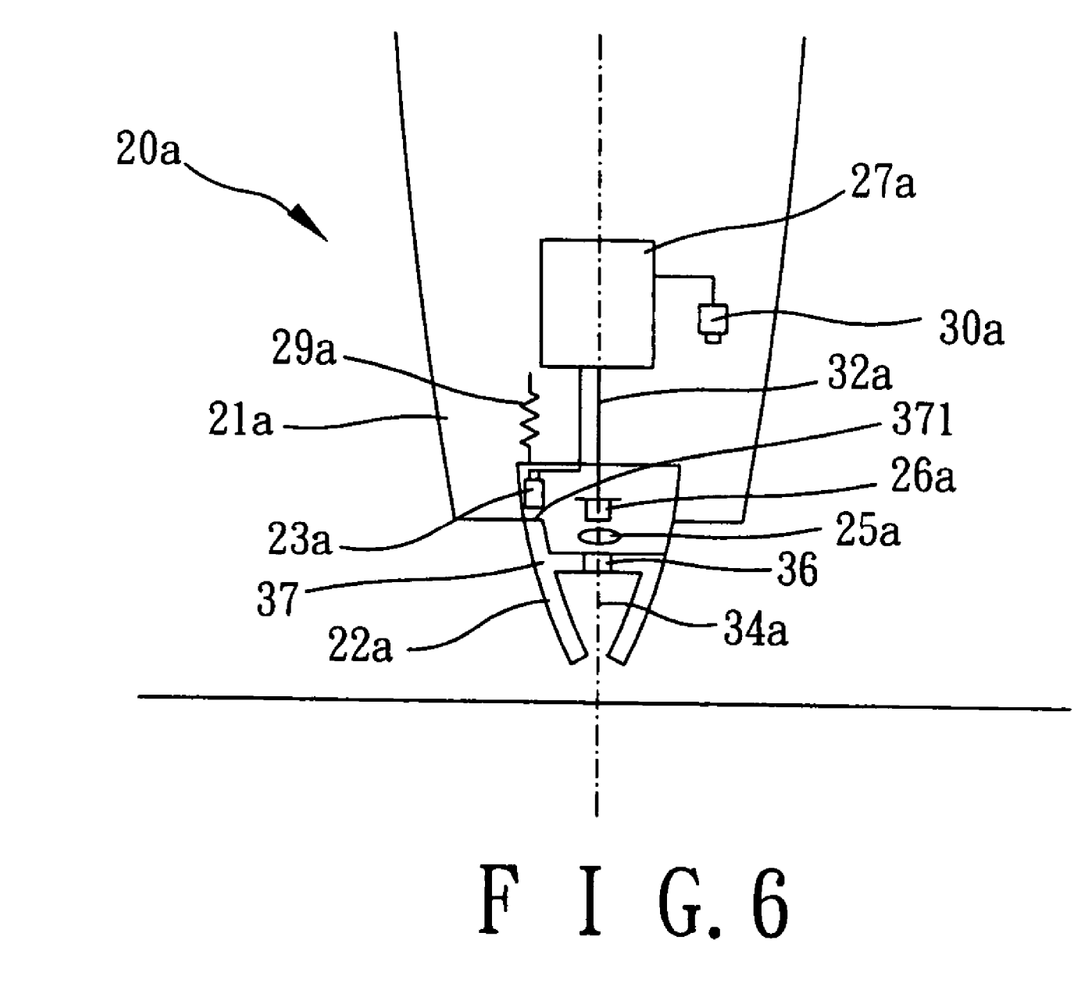
FIG. 6 is a schematic view of the third preferred embodiment of an optical pen having a light path coaxial with the pen tip according to the invention.

As shown in FIG. 6, the third preferred embodiment of an optical pen 20a having a light path coaxial with pen tip according to the present invention comprises: a shaft 21a, a pen tip 22a, a light source 23a, a second lens 25a, an optical sensor 26a, a control unit 27a, a button (not shown here), an elastic member 29, and a pressure sensor 30a. Its dissimilarities with other embodiments are as follows:

The part of pen tip 22a that extends along axial direction 32a is further disposed with a hollow space 35 and a through-hole 36 which allow imaging light to pass through. Furthermore, pen tip 22a is made of light guiding material and designed with a light guide 37. One end 371 of the light guide 37 is adjacent to light source 23a, while the other end is adjacent to the end of pen tip 22a. Light produced by light source 23a is emitted to and guided by light guide 37. That is, the light undergoes multiple reflections in light guide 37, travels forwards along the extension of light guide 37, and finally exits from the end of pen tip 22a. Through the arrangement of light guide 37, light produced by light source 23a may be guided and converge towards an area near pen tip 22a to achieve convergence of rays without the setup of a first lens. In this embodiment, both light source 23a and optical sensor 26a are disposed inside pen tip 22a. Thus when pen tip 22a undergoes extension/retraction displacement, light source 23a and optical sensor 26a move along with pen tip 22a. With such design, the length of light path 34a of optical pen 20a will not be influenced by the extension or retraction of pen tip 22a.

Figure 7:
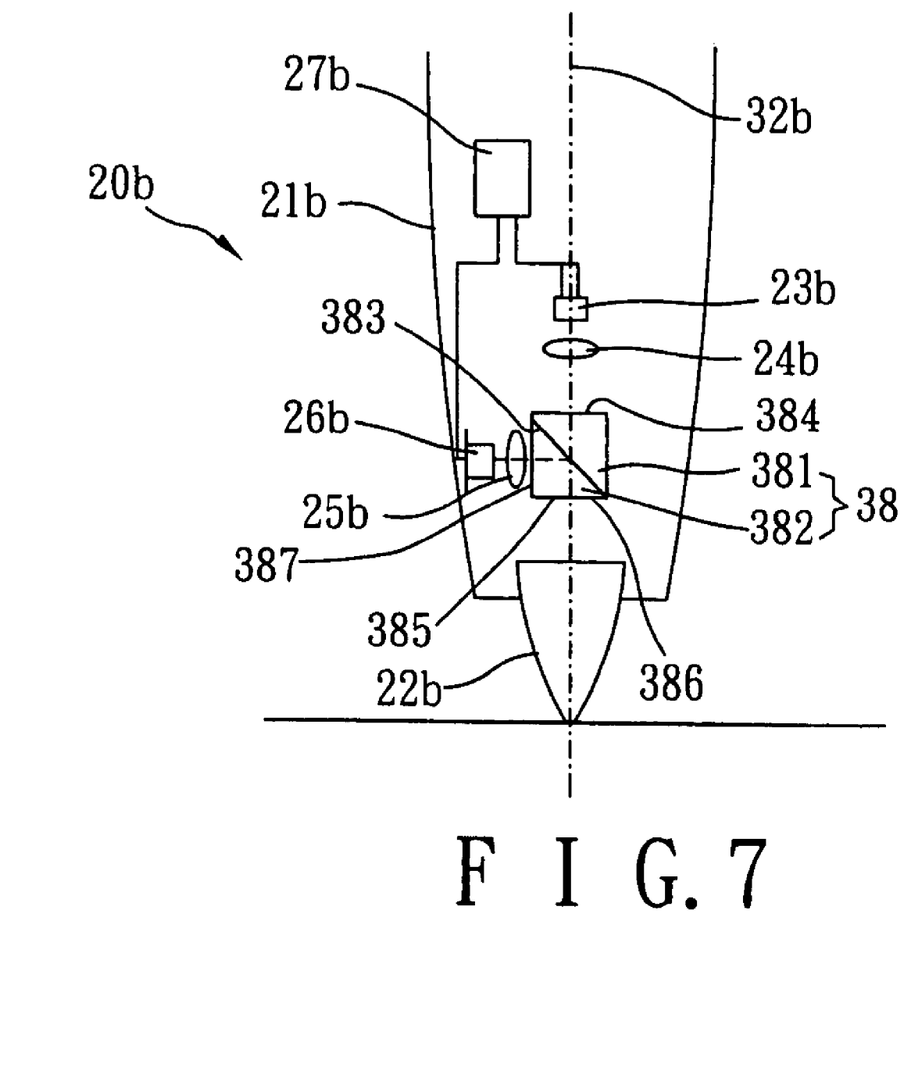
FIG. 7 is a schematic view of the fourth preferred embodiment of an optical pen having a light path coaxial with the pen tip according to the invention.

As shown in FIG. 7, the fourth preferred embodiment of an optical pen 20b having a light path coaxial with pen tip according to the present invention similarly comprises: a shaft 21b, a pen tip 22b, a light source 23b, a first lens 24b, a second lens 25b, an optical sensor 26b, and a control unit 27b. Its dissimilarities with other embodiments are as follows:

The optical pen 20b further comprises a prism set 38 situated along the axial direction. Said prism set 38 is a RTIR (Reversed Total Internal Reflection) and further includes: a first prism 381 having a wedged section and a second prism 382 having a right-angled triangular section. Both first prism 381 and second prism 382 are made of transparent material with predetermined refractive index so that the interface 383 of first prism 381 and second prism 382 becomes a total reflection surface for rays entered at a predetermined angle in one direction. The prism set 38 consists of a first light-entering surface 384, a first light-exiting surface 385, a second light-entering surface 386 and a second light-exiting surface 387, wherein light emitted into the first light-entering surface 384 at a predetermined angle will exit from the first light-exiting surface 385, and light emitted into the second light-entering surface 386 will exit from the second light-exiting surface 387, while the first light-exiting surface 385 and the second light-entering surface 386 are the same surface. Light produced by light source 23b shines on the first light-entering surface 384 by and large along axial direction 32b, penetrating the prism set 38, exiting from the first light-exiting surface 385 and shooting at the vicinity of pen tip 22b. In addition, optical sensor 26b is situated near the second light-exiting surface 387. Imaging light shot back from the vicinity of pen tip 22b enters the prism set 38 from the second-entering surface 386 and exits from the second light-exiting surface 387 after undergoing reflection to reach optical sensor 26b. Through the arrangement of a prism set 38, the light emitted from light source 23b is more efficiently utilized.

Figure 8:
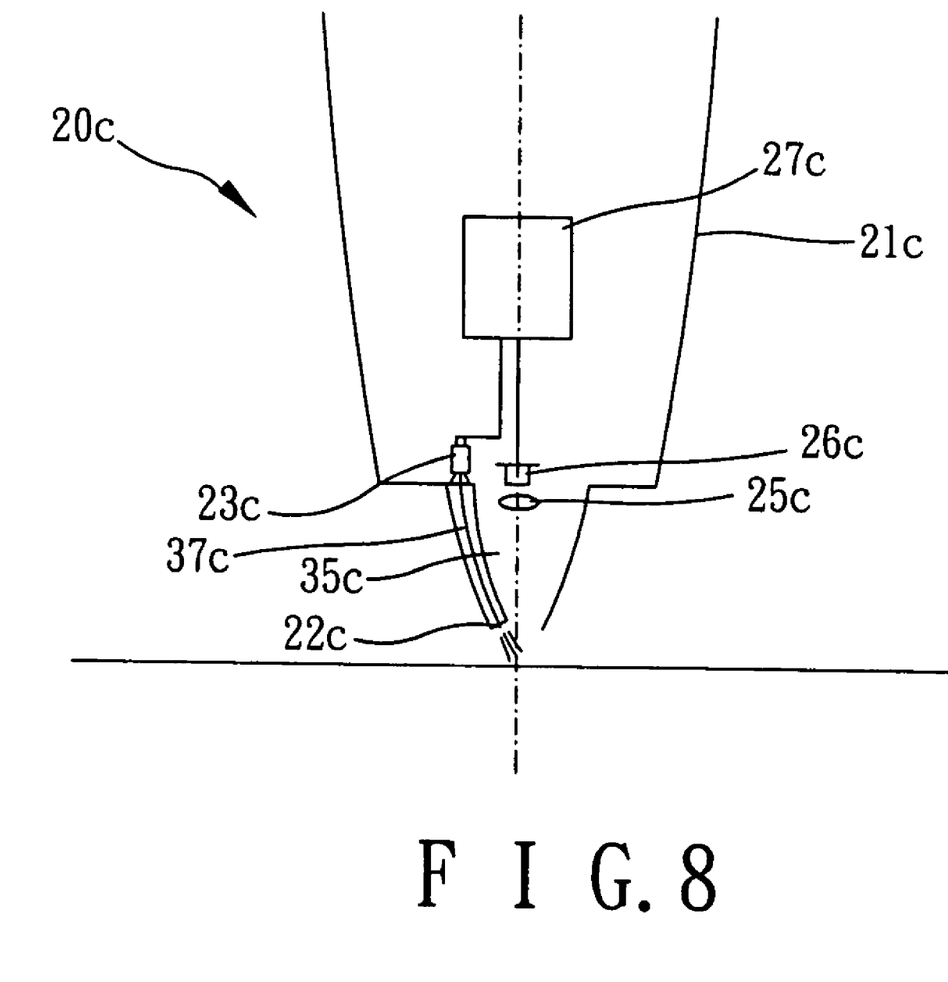
FIG. 8 is a schematic view of the fifth preferred embodiment of an optical pen having a light path coaxial with the pen tip according to the invention.

The fifth preferred embodiment of an optical pen 20c having a light path coaxial with pen tip as shown in FIG. 8 similarly comprises: a shaft 21c, a pen tip 22c, a light source 23c, a second lens 25c, an optical sensor 26c, a control unit 27c, a hollow space 35c, and a light guide 37c. Its dissimilarities with other embodiments are as follows:

The light guide 37c of pen tip 22c is secured to the shaft 21c, so pen tip 22c is not retractable. In addition, the portion of light guide 37c adjacent to the end of pen tip 22c has a tapering section design to enhance convergence of rays.

Figure 9:
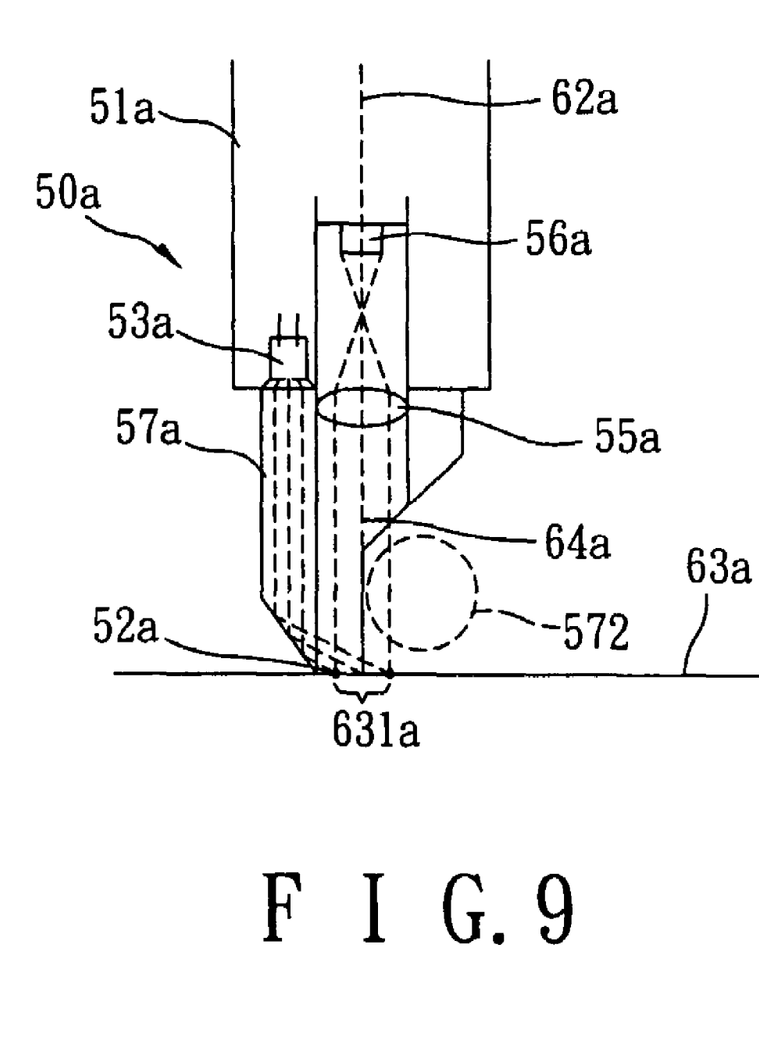
FIG. 9 is a schematic view of the sixth preferred embodiment of an optical pen having a light path coaxial with the pen tip according to the invention.

The sixth preferred embodiment of an optical pen 50a having a light path coaxial with pen tip as shown in FIG. 9 similarly comprises: a shaft 51a, a pen tip 52a, a light source 53a, a lens 55a, an optical sensor 56a, and a light guide 57a, where the light path 64a of imaging light reflected from a small area 631a on the outlying surface 63a is coaxial with the axial direction 62a of shaft 51a. Its dissimilarities with other embodiments are as follows:

The portion of light guide 57a farther away from light source 53a but closer to area 631a (the lower right section of light guide 57a as shown in FIG. 9) consists of an excised part 572, which gives light guide 57a a sharper tip 52a construction of a fountain pen to facilitate writing.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An optical pen having a light path coaxial with its pen tip, comprising:
   a shaft extending a predetermined length;
   a pen tip arranged at one end of shaft and having a defined axial direction;
   a light source for producing light to shine on the vicinity of pen tip; and
   an optical sensor for receiving imaging light from the vicinity of pen tip and converting it into an electrical signal;
   wherein the path traveled by the imaging light overlaps with said axial direction;

wherein said optical pen further comprises:
a control unit connected to the light source and the optical sensor to receive the electrical signal from optical sensor and generate a first corresponding control signal after processing;
a button connected to the control unit which, when pressed, enables the control unit to generate a second corresponding control sign;
an elastic member connected to the pen tip and enabling the pen tip to extend and retract a predetermined distance upon an exertion of an external pressure; and
a pressure sensor disposed inside the shaft adjacent to the pen tip, detecting an extension and retraction of the pen tip, and generating a third corresponding control signal;
wherein both said light source and said optical sensor are connected to the pen tip, when the pen tip is extended and retracted, the light source and the optical sensor move with the pen tip.

2. The optical pen according to claim 1, wherein said pen tip is made of light guiding material and designed with a light guide where one end of said light guide is adjacent to the light source and the other end is adjacent to the end of pen tip; light produced from said light source is emitted into and guided by said light guide and exits from the end of pen tip.

3. The optical pen according to claim 2, wherein a portion of light guide away from the light source but closer to the end of pen tip consists of an excised part, which gives light guide a sharper tip construction.

4. An optical pen having a light path coaxial with its pen tip, comprising:
a shaft extending a predetermined length;
a pen tip arranged at one end of shaft and having a defined axial direction;
a light source for producing light to shine on an outlying surface near the pen tip to produce a reflected imaging light;
a light path situated inside the pen tip along which the imaging light travels and having at least a portion of the light path near the pen tip overlapping with said axial direction; and
an optical sensor situated on said light path for receiving the imaging light and converting it into an electrical signal;
wherein said optical pen further comprises:
a prism set situated in said axial direction, comprising a first light-entering surface, a first light-exiting surface, a second light-entering surface and a second light-exiting surface, wherein light emitted into the first light-entering surface at a predetermined angle will exit from the first light-exiting surface, and light emitted into the second light-entering surface will exit from the second light-exiting surface, while the first light-exiting surface and the second light-entering surface are the same surface, and the first light-entering surface and the second (light-exiting surface are different surfaces;
wherein light produced by tight source shines on the first light-entering surface by and large along the axial direction, penetrating the prism set, exiting from the first light-exiting surface and shooting at the vicinity of pen tip; optical sensor is situated near the second light-exiting surface where imaging light shot back from the vicinity of pen tip enters the prism set from the second light-entering surface and exits from the second light-exiting surface after undergoing reflection to reach the optical sensor;
wherein said prism set is a Reversed Total Internal Reflection prism and further includes: a first prism having a wedged section and a second prism having a right-angled triangular section; both the first prism and the second prism are made of transparent material with predetermined refractive index so that their interface becomes a total reflection surface for rays entered at a predetermined angle in one direction.

5. The optical pen according to claim 4, wherein said optical pen further comprises:
a control unit connected to the light source and the optical sensor to receive the electrical signal from optical sensor and generate a first corresponding control signal after processing;
a button connected to the control unit which, when pressed, enables the control unit to generate a second corresponding control sign;
an elastic member connected to the pen tip which enables the pen tip to carry out extension/retraction displacement of predetermined distance upon the exertion of external pressure; and
a pressure sensor disposed inside the shaft adjacent to the pen tip that can detect the extension/retraction displacement of pen tip and generate a third corresponding control signal.

6. The optical pen according to claim 4, wherein said pen tip is made of light guiding material and designed with a light guide where one end of said light guide is adjacent to the light source and the other end is adjacent to the end of pen tip; light produced from said light source is emitted into and guided by said light guide and exits from the end of pen tip.

7. An optical pen having a light path coaxial with its pen tip, comprising:
a shaft extending a predetermined length;
a pen tip arranged at one end of shaft and having a defined axial direction;
a light source for producing light;
a light guide disposed near the light source which guides light produced by light source to shoot at the vicinity of pen tip at a predetermined angle and produces an imaging light from the vicinity of pen tip which travels along a predetermined light path where the light path at least partially overlaps with said axial direction; and
an optical sensor situated on said light path for receiving the imaging light and converting it into an electrical signal;
wherein said optical pen further comprising:
a half-reflective-half-transparent mirror situated in the axial direction at an inclined angle intersecting the axial direction with light source and optical sensor disposed at two opposing sides;
wherein part of the light produced from light source is reflected by the half-reflective-half-transparent mirror so as to shoot at the vicinity of pen tip; the optical sensor is situated in axial direction where part of imaging light shot back from the vicinity of pen tip would penetrate the half-reflective-half-transparent mirror and reach optical sensor.

8. The optical pen according to claim 7, wherein said optical pen further comprises:
  a control unit connected to the light source and the optical sensor to receive the electrical signal from optical sensor and generate a first corresponding control signal after processing;
  a button connected to the control unit which, when pressed, enables the control unit to generate a second corresponding control sign;
  an elastic member connected to the pen tip which enables the pen tip to carry out extension/retraction displacement of predetermined distance upon the exertion of external pressure; and
  a pressure sensor disposed inside the shaft adjacent to the pen tip that can detect the extension/retraction displacement of pen tip and generate a third corresponding control signal.

9. The optical pen according to claim 7, wherein said pen tip is made of light guiding material and designed with a light guide where one end of said light guide is adjacent to the light source and the other end is adjacent to the end of pen tip; light produced from said light source is emitted into and guided by said light guide and exits from the end of pen tip.

* * * * *